US011186168B1

United States Patent
Kim et al.

(10) Patent No.: US 11,186,168 B1
(45) Date of Patent: Nov. 30, 2021

(54) POWER TRAIN FOR VEHICLE

(71) Applicants: Hyundai Motor Company, Seoul (KR); Kia Motors Corporation, Seoul (KR)

(72) Inventors: Jin Yong Kim, Incheon (KR); Sang Bum Baek, Seoul (KR); Jong Yun Park, Hwaseong-si (KR); Eun Chan Lee, Suwon-si (KR); Byung Dae Choi, Seoul (KR); Hye Sung Jeong, Daejeon (KR); Sung Wha Hong, Hwaseong-si (KR); Bung Chul Rim, Yongin-si (KR); Gwang Soo Hwang, Hwaseong-si (KR); Joon Lee, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/153,114

(22) Filed: Jan. 20, 2021

(30) Foreign Application Priority Data

Aug. 14, 2020 (KR) .................. 10-2020-0102361

(51) Int. Cl.
| | |
|---|---|
| *F16H 48/40* | (2012.01) |
| *F16H 48/38* | (2012.01) |
| *B60K 17/16* | (2006.01) |
| *B60K 1/00* | (2006.01) |
| *F16H 57/08* | (2006.01) |
| *F16H 57/037* | (2012.01) |
| *F16H 57/02* | (2012.01) |

(52) U.S. Cl.
CPC .............. *B60K 17/16* (2013.01); *B60K 1/00* (2013.01); *F16H 48/38* (2013.01); *F16H 48/40* (2013.01); *F16H 57/037* (2013.01); *F16H 57/08* (2013.01); *F16H 2048/385* (2013.01); *F16H 2057/02034* (2013.01); *F16H 2057/02052* (2013.01)

(58) Field of Classification Search
CPC ......... B60K 17/16; B60K 1/00; F16H 57/037; F16H 57/08; F16H 48/38; F16H 48/40; F16H 2048/385; F16H 2057/02034; F16H 2057/02052

See application file for complete search history.

(56) References Cited

U.S. PATENT DOCUMENTS 4,788,888 A * 12/1988 Tsutsumikoshi ....... B60K 17/35
                                                          180/250
5,385,513 A *  1/1995 Ishii ...................... B60K 17/08
                                                          475/198

(Continued)

FOREIGN PATENT DOCUMENTS

CN     108202595 A  *  6/2018  .............. F16H 1/20
DE  102013222738 A1  *  5/2015  .............. F16H 48/40

(Continued)

*Primary Examiner* — Sherry L Estremsky
(74) *Attorney, Agent, or Firm* — Morgan, Lewis & Bockius LLP

(57) ABSTRACT

A power train for a vehicle may include a differential case; a differential ring gear aligned to be concentric to the differential case, and provided in a relatively rotatable state therebetween; and a connection/disconnection mechanism provided to connect or disconnect the differential ring gear and the differential case in a state where power is transferred thereto.

9 Claims, 8 Drawing Sheets

(56) References Cited

U.S. PATENT DOCUMENTS

| | | | | |
|---|---|---|---|---|
| 6,698,565 B2* | 3/2004 | Cool | ............... | F16H 48/08 |
| | | | | 180/248 |
| 6,969,333 B2* | 11/2005 | Sayama | ............... | B60K 6/26 |
| | | | | 475/5 |
| 7,094,172 B2* | 8/2006 | Ishikawa | ............ | F16H 57/0483 |
| | | | | 475/231 |
| 7,270,205 B2* | 9/2007 | Sakai | ............... | B60K 23/08 |
| | | | | 180/65.6 |
| 7,990,004 B2* | 8/2011 | Aikawa | ............... | B60K 6/48 |
| | | | | 310/89 |
| 8,986,151 B2* | 3/2015 | Valente | ............... | B60K 17/346 |
| | | | | 475/231 |
| 9,649,931 B2* | 5/2017 | Zhao | ............... | B60K 17/3462 |
| 10,876,613 B2* | 12/2020 | Leitner | ............... | F16H 48/38 |

FOREIGN PATENT DOCUMENTS

| | | | |
|---|---|---|---|
| KR | 10-2016-0007632 A | 1/2016 | |
| WO | WO-2019204300 A1 * | 10/2019 | ............ F16H 48/26 |

* cited by examiner

POWER TRAIN FOR VEHICLE

CROSS REFERENCE TO RELATED APPLICATION

The present application claims priority to Korean Patent Application No. 10-2020-0102361 filed on Aug. 14, 2020, the entire contents of which is incorporated herein for all purposes by this reference.

BACKGROUND OF THE PRESENT INVENTION

Field of the Invention

The present invention relates to a power train for a vehicle, and more specifically, is a technology about a differential of a 4 wheel drive (4 WD) vehicle.

Description of Related Art

A 4 WD power train for a vehicle may be variously configured, and among them, the 4 WD power train may be configured in a method in which each of a front wheel and a rear wheel is driven by a separate power source in a state where the front wheel and the rear wheel are not mechanically connected.

For example, the 4 WD may be implemented in a method in which the front wheel is driven by an engine, and the rear wheel is driven by the motor, and an electric vehicle may be configured so that a front wheel is driven by a separate motor, implementing the 4 WD.

As described above, if a vehicle mounted with the 4 WD power train configured so that each of the front wheel and the rear wheel is driven by a separate power source implements a 2 WD or performs a coasting, it is preferable to release the mechanical connection state of a vehicle wheel not driven from the corresponding power source.

For example, if the 2 WD is driven by only a front wheel in a vehicle in which a rear wheel is driven by a motor, the mechanical connection between the rear wheel and the motor is blocked to reduce a drag loss, improving fuel efficiency of the vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power train for a vehicle, which may minimize a drag loss of a non-driven wheel, if a vehicle mounted with a 4 WD power train configured so that each of a front wheel and a rear wheel is driven is driven by a separate power source implements a 2 WD or performs a coasting, ultimately improving fuel efficiency of the vehicle.

A power train for a vehicle according to various exemplary embodiments of the present invention for achieving the object includes: a differential case; a differential ring gear aligned to be concentric to the differential case, and provided in a relatively rotatable state therebetween; and a connection/disconnection mechanism provided to connect or disconnect the differential ring gear and the differential case in a state where power may be transferred.

The connection/disconnection mechanism may include: a first gear part provided on a side of the differential ring gear; a second gear part provided on a side of the differential case; and a sleeve linearly sliding in an axial direction of the differential ring gear to switch a state of being engaged with both the first gear part and the second gear part and a state of being engaged with only any one side by linearly sliding in the axial direction of the differential ring gear.

The differential ring gear may have an internal diameter portion of a hub supported by a housing surrounding the outside of the differential in a rotatable state, the differential case may have external diameter portions of both end portions supported by the housing in a rotatable state, the first gear part of the connection/disconnection mechanism may be formed on an external circumferential surface of the hub of the differential ring gear, and the second gear part of the connection/disconnection mechanism may be formed on an external circumferential surface of a ring part, which is formed to protrude from the differential case toward the hub of the differential ring gear.

The differential ring gear may have an internal diameter portion of a hub supported by an external circumferential surface of the differential case in a rotatable state, the first gear part of the connection/disconnection mechanism may be formed on an external circumferential surface of the hub of the differential ring gear, and the second gear part of the connection/disconnection mechanism may be formed on an external circumferential surface of a ring part, which is formed to protrude from the differential case toward the hub of the differential ring gear.

The differential ring gear may have an internal diameter portion of a hub supported by an external circumferential surface of the differential case in a rotatable state, the first gear part of the connection/disconnection mechanism may be formed on an external circumferential surface of the hub of the differential ring gear, and the second gear part of the connection/disconnection mechanism may be formed on the external circumferential surface of the differential case.

The differential ring gear may be connected to a cylinder surrounding the outside of the differential case, the first gear part of the connection/disconnection mechanism may be formed on the cylinder, and the second gear part of the connection/disconnection mechanism may be formed on the external circumferential surface of the differential case.

The differential ring gear may be engaged with a drive gear for transferring the power from a motor, the drive gear may be fixedly connected to a speed reduction driven gear, the speed reduction driven gear may be engaged with a pinion of the motor, and a rotation shaft of the motor may be mounted to be parallel to and spaced from a rotation shaft of the differential ring gear.

The differential ring gear may be engaged with a drive gear for transferring the power from a motor, the drive gear may be fixedly connected to a speed reduction driven gear, the speed reduction driven gear may be engaged with a pinion of the motor, and a rotation shaft of the motor may be mounted to be concentric to a rotation shaft of the differential ring gear.

The rotation shaft of the motor may be formed of a hollow shaft, and the driveshaft engaged with a side gear of the differential may be provided to penetrate a rotation shaft of the motor.

The sleeve may be coupled to a shift fork for constraining each other in the axial direction thereof and allowing a relative rotation, and the shift fork may be configured to be linearly slidable by a ball screw.

The present invention may block between the differential case of the non-driven wheel and the differential ring gear to minimize the drag loss, if the vehicle mounted with the 4 WD power train configured so that each of the front wheel and the rear wheel is driven by the separate power source implements the 2 WD or performs the coasting, improving fuel efficiency of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
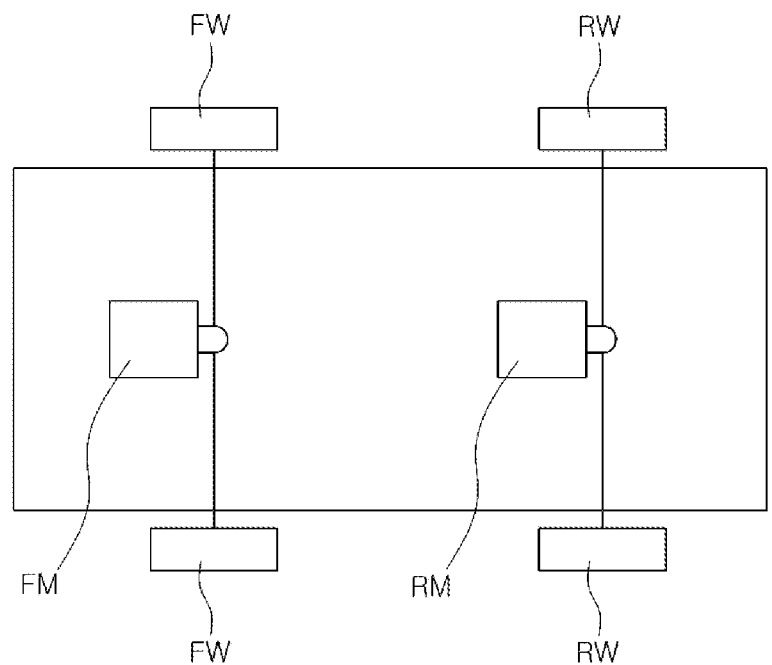
FIG. 1 is a diagram illustrating a power train of a 4 WD vehicle to which various exemplary embodiments of the present invention is applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a diagram illustrating a power train of a 4 WD vehicle to which various exemplary embodiments of the present invention is applicable, and a front wheel (FW) is driven by a front wheel motor (FM) located on the front of a vehicle, a rear wheel (RW) is driven by a rear wheel motor (RM) located on the rear of the vehicle, implementing a 4 WD, and when implemented, the 2 WD may be implemented so that a driving force is not supplied to any one of the front wheel and the rear wheel, and if the vehicle is traveled by a coasting during traveling, the driving force is not supplied to all vehicle wheels.

As described above, when the 2 WD state or the coasting state is implemented, it is preferable to minimize a drag loss of a vehicle wheel to which a driving force is not supplied, and the present invention may be configured to minimize the drag loss of the non-driven wheel in such a situation.

Referring to FIG. 2, FIG. 3, FIG. 4, FIG. 5, FIG. 6, and FIG. 7, various exemplary embodiments of the present invention commonly include a differential case 1; a differential ring gear 3 concentric to the differential case 1, and provided in a relatively rotatable state; and a connection/disconnection mechanism 5 provided to connect or disconnect the differential ring gear 3 and the differential case 1 in a state where power may be transferred.

That is, a power train according to various exemplary embodiments of the present invention is configured to connect or disconnect between the differential ring gear 3 and the differential case 1 by the connection/disconnection mechanism 5 such that the connection/disconnection mechanism 5 may disconnect between the differential case 1 connected to a vehicle wheel side through a driveshaft 7 and a power source of a motor, an engine, or the like connected through a drive gear 9, which is a final reduction gear with the connection/disconnection mechanism 5.

Therefore, in the case of the 2 WD, the coasting, or the like, when the aforementioned connection/disconnection mechanism 5 disconnects between the differential case 1 and the differential ring gear 3 in the differential to which a non-driven wheel is connected, the non-driven wheel rotates freely with the differential case 1, and the differential ring gear 3 and the power source do not rotate such that a drag applied to the non-driven wheel may be largely reduced compared to a case of rotating with the power source, largely improving fuel efficiency of the vehicle.

Conventionally, in the case of reducing the drag of the non-driven wheel in a method for selectively connecting any one of two driveshafts for transferring power to both vehicle wheels in the differential, in a state where the power source is not driven, a small internal drag of the differential is generated by high speed rotations of a pinion and side gears inside the differential even in a straight state by the rotation of the other driveshaft not connected or disconnected.

Furthermore, in such a state, when the driveshaft is intended to be connected again, two portions of the driveshaft rotating in the directions opposite to each other are required to be connected such that a speed control of a motor is relatively difficult.

However, the aforementioned present invention does not generate the aforementioned internal drag of the differential, and even when the power source is intended to be connected to the vehicle wheel again, the differential case 1 and the differential ring gear 3, which rotate in the same direction, are connected such that there is an advantage in that the speed control of the motor configured for driving the differential ring gear 3 is relatively easy.

The connection/disconnection mechanism 5 includes a first gear part 11 provided on the differential ring gear 3 side; a second gear part 13 provided on the differential case 1 side; and a sleeve 15 linearly sliding along the axial direction of the differential ring gear 3 to switch a state of being engaged to both the first gear part 11 and the second gear part 13 and a state of being engaged to only any one side thereof.

That is, the connection/disconnection mechanism 5 may be configured as a mechanism similar to a dog clutch or synchronizer of a conventional manual transmission.

Therefore, if the motor is used as the power source, it will be advantageous to implement the connection/disconnection mechanism 5 with a configuration of the dog clutch in terms of the cost due to the excellence of the speed control thereof, but if the engine is used as the power source, it is also possible to apply the present invention by implementing the connection/disconnection mechanism 5 with the configuration of the synchronizer.

For reference, here, the 'axial direction' refers to a direction of a rotation shaft of the differential ring gear 3.

The aforementioned configurations are features common to all exemplary embodiments of the present invention, and hereinafter, various exemplary embodiments will be described.

Figure 2:
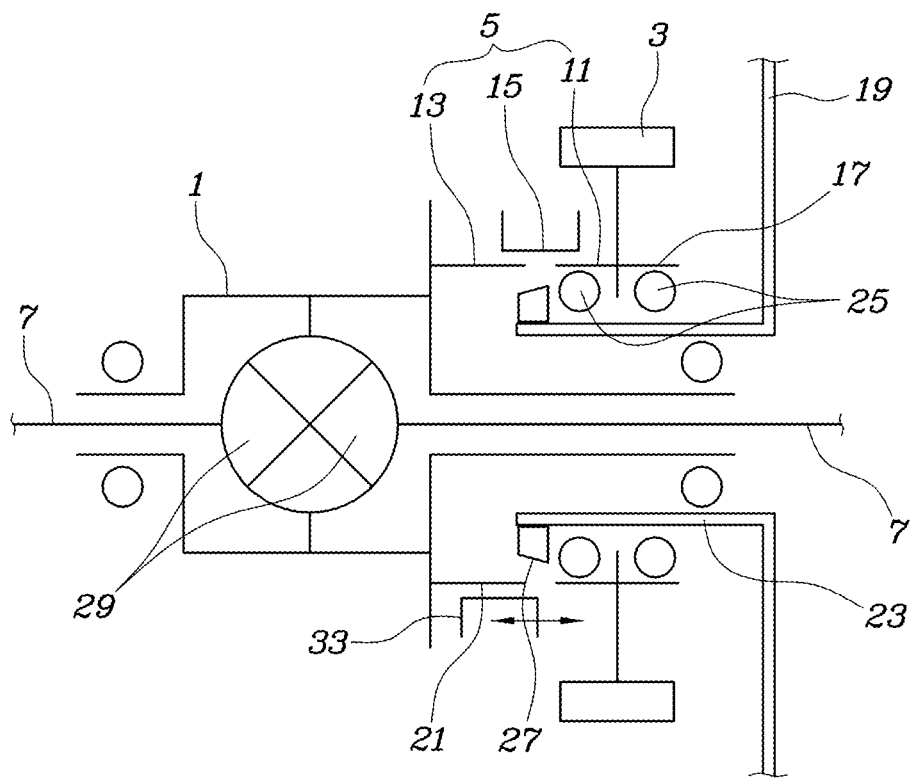
FIG. 2 is a diagram illustrating various exemplary embodiments of a power train for a vehicle according to various exemplary embodiments of the present invention.

FIG. 2 illustrates various exemplary embodiments of the present invention, configured such that the differential ring gear 3 has an internal diameter portion of a hub 17 supported by a housing 19 for surrounding the outside of the differential in a rotatable state; the differential case 1 has external diameter portions of both end portions supported by the housing 19 in a rotatable state; the first gear part 11 of the connection/disconnection mechanism 5 is formed on the external circumferential surface of the hub 17 of the differential ring gear 3; and the second gear part 13 of the connection/disconnection mechanism 5 is formed on an external circumferential surface of a ring part 21 formed to protrude from the differential case 1 toward the hub 17 of the differential ring gear 3.

That is, the hub 17 of the differential ring gear 3 is supported by a bearing 25 on the outside of a journal part 23 protruding in the axial direction of the housing 19, one side of the differential case 1 is supported by the bearing 25 on an inside thereof, and the connection/disconnection mechanism 5 is configured by the first gear part 11 of the external circumferential surface of the hub 17 of the differential ring gear 3 and the second gear part 13 of the external circumferential surface of the ring part 21 of the differential case 1, and the sleeve 15.

A locking nut 27 for preventing the bearing 25 from being separated is fastened next to the bearing 25 for supporting the hub 17 of the differential ring gear 3 by the housing 19.

Here, as illustrated, the ring part 21 may be added to the differential case 1 in a separate annular shape, or also configured integrally with the differential case 1.

For reference, the sleeve 15 is a structure of a ring being located to be concentric to the axial direction and sliding in the axial direction, and for convenience, any one side of the top portion and bottom portion of the drawing illustrates a state of connecting the first gear part 11 to the second gear part 13, and the other side thereof illustrates a state of releasing the first gear part 11 and the second gear part 13 together such that the operations thereof are described together.

In the state where the sleeve 15 connects the first gear part 11 to the second gear part 13, the power of the power source input to the differential ring gear 3 is transferred to the vehicle wheel through the driveshafts 7 coupled to the side gears 29 of both sides through the differential case 1, and in the state where the sleeve 15 disconnects the first gear part 11 and the second gear part 13, the differential ring gear 3 and the differential case 1 are disconnected such that even if the vehicle wheel connected to the differential case 1 through the driveshaft 7 is rotated, the differential ring gear 3 and the power source connected thereto may maintain a stop state.

That is, as described above, in the 2 WD state or the coasting state, when the connection/disconnection mechanism 5 disconnects the differential case 1 and the differential ring gear 3, the corresponding vehicle wheel is in a state of rotating with the differential case 1, and as long as the vehicle is not turned, a drag due to the differential may not be generated inside the differential case 1, largely reducing the drag loss of the non-driven wheel.

Figure 3:
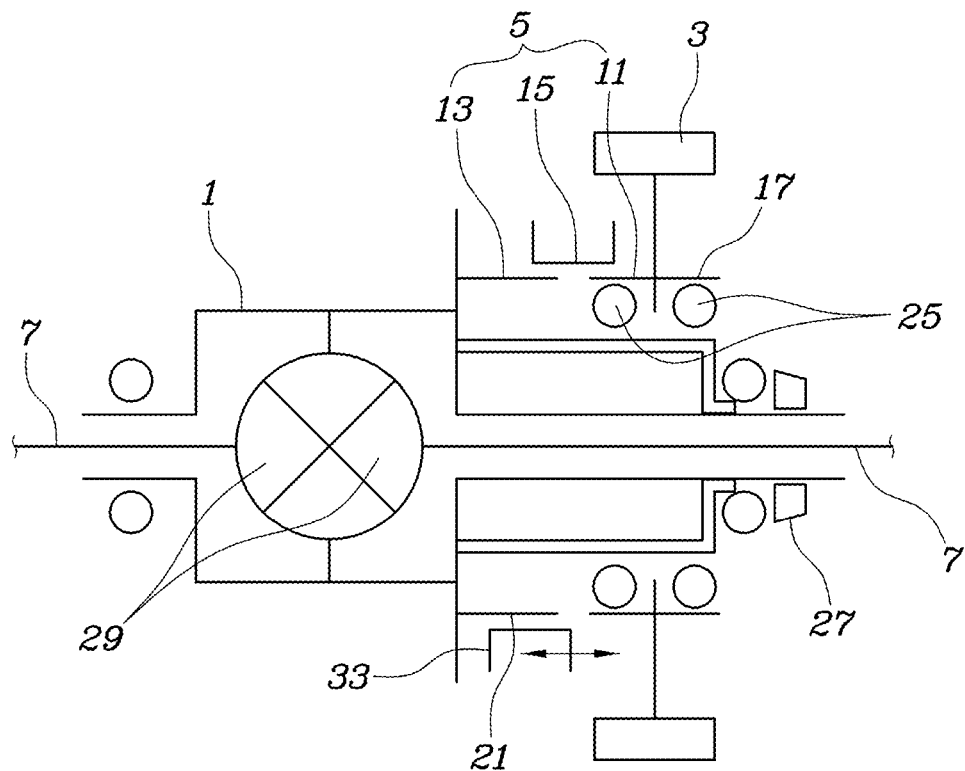
FIG. 3 is a diagram illustrating various exemplary embodiments of the power train for a vehicle according to various exemplary embodiments of the present invention.

FIG. 3 illustrates various exemplary embodiments of the present invention, configured such that the differential ring gear 3 has the internal diameter portion of the hub 17 supported by the external circumferential surface of the differential case 1 in a rotatable state; the first gear part 11 of the connection/disconnection mechanism 5 is formed on the external circumferential surface of the hub 17 of the differential ring gear 3; and the second gear part 13 of the connection/disconnection mechanism 5 is formed on the external circumferential surface of the ring part 21 formed to protrude from the differential case 1 toward the hub 17 of the differential ring gear 3.

Here, as illustrated, the ring part 21 may be added to the differential case 1 in a separate annular shape, or also configured integrally with the differential case 1.

Figure 4:
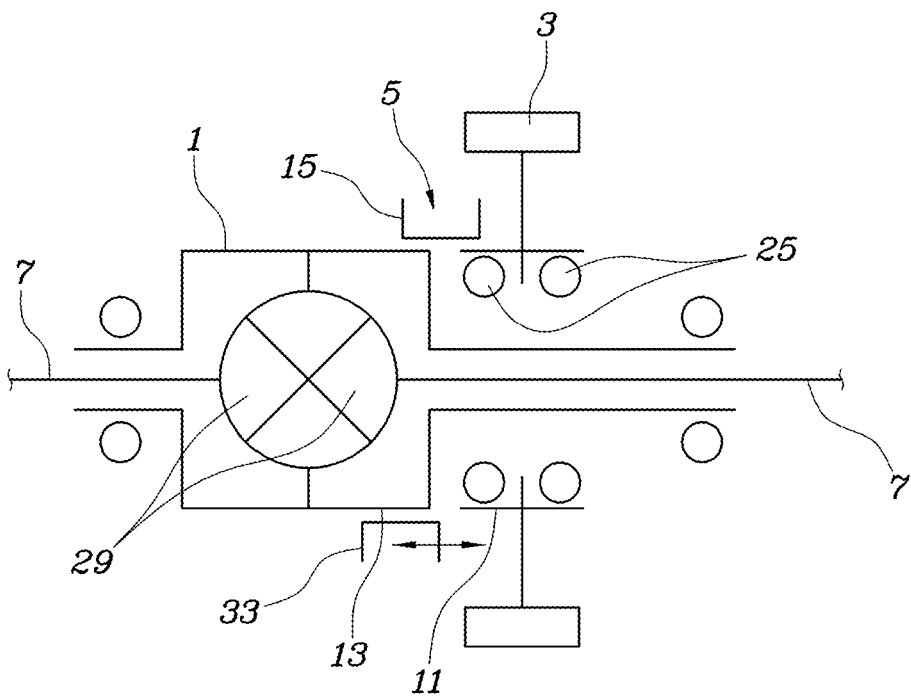
FIG. 4 is a diagram illustrating various exemplary embodiments of the power train for a vehicle according to various exemplary embodiments of the present invention.
Figure 5:
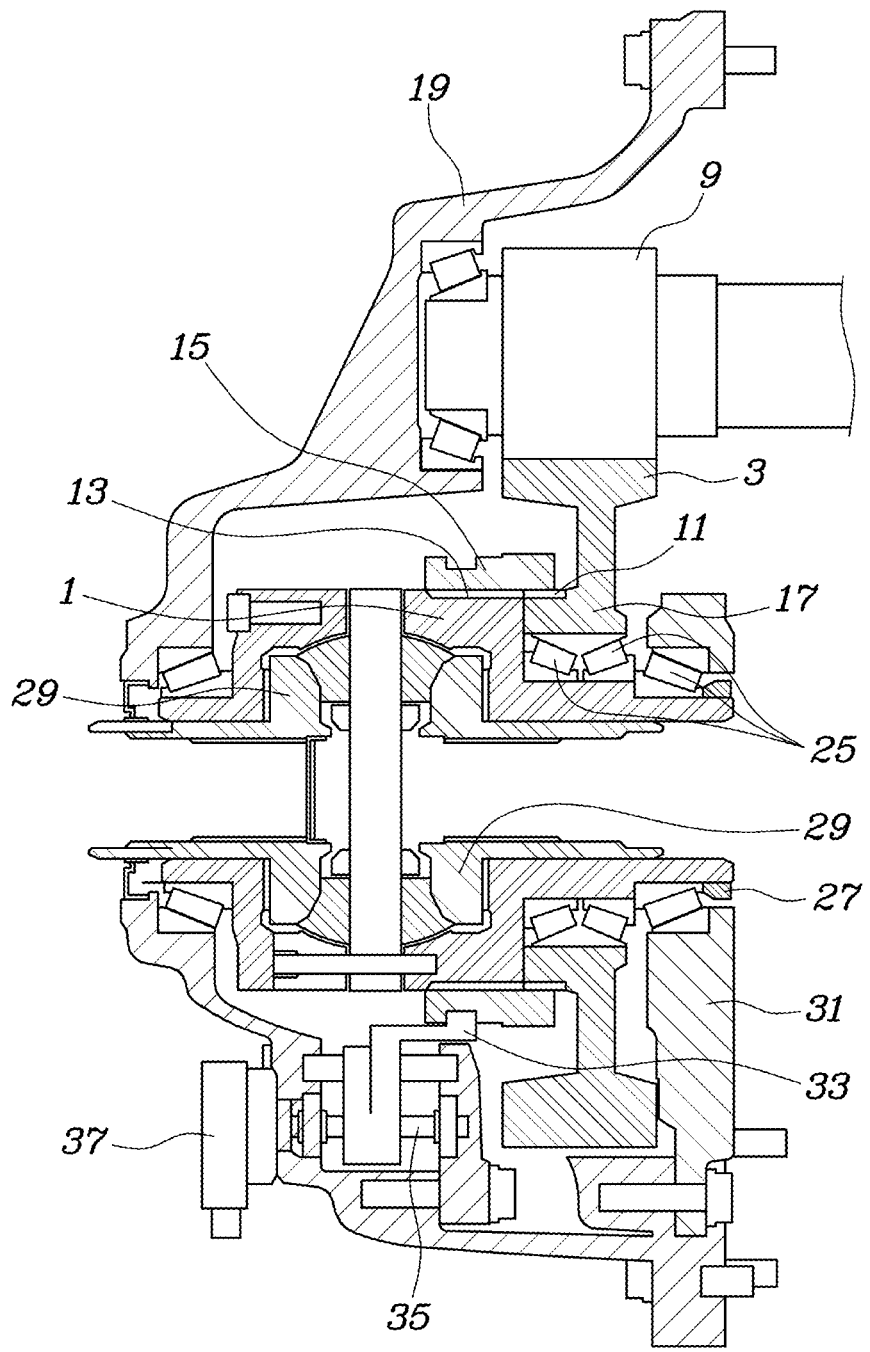
FIG. 5 is a diagram illustrating the various exemplary embodiments more actually.

FIG. 4 and FIG. 5 actually illustrate the various exemplary embodiments of the present invention, configured such that the differential ring gear 3 has the internal diameter portion of the hub 17 supported by the external circumferential surface of the differential case 1 in a rotatable state; the first gear part 11 of the connection/disconnection mechanism 5 is formed on the external circumferential surface of the hub 17 of the differential ring gear 3; and the second gear part 13 of the connection/disconnection mechanism 5 is formed on the external circumferential surface of the differential case 1.

That is, although the first various exemplary embodiments form the second gear part 13 on the ring part 21 connected to the differential case 1, the exemplary embodiment of the present invention may directly form the second gear part 13 on the external circumferential surface of the differential case 1, further reducing the number of components or the weight thereof.

For reference, a partition wall 31 illustrated in FIG. 5 is to support the differential case 1, and has a structure of being coupled integrally with the housing 19.

Furthermore, the sleeve 15 is coupled to a shift fork 33 for constraining each other in the axial direction and allowing the relative rotation, and the shift fork 33 is configured to be linearly slidable by a ball screw 35.

The ball screw 35 is configured such that when the ball screw 35 is provided to be rotatable by a control motor 37 and the control motor 37 is driven, the shift fork 33 may drive the sleeve 15 to connect or disconnect the power of the connection/disconnection mechanism 5 while linearly sliding in the axial direction thereof.

Of course, the sleeve 15 may also be configured to be linearly slid by an actuator operated by pneumatic or hydraulic pressure as the actuator for linearly sliding the sleeve 15 in addition to the aforementioned configurations of the ball screw 35 and the control motor 37.

Figure 6:
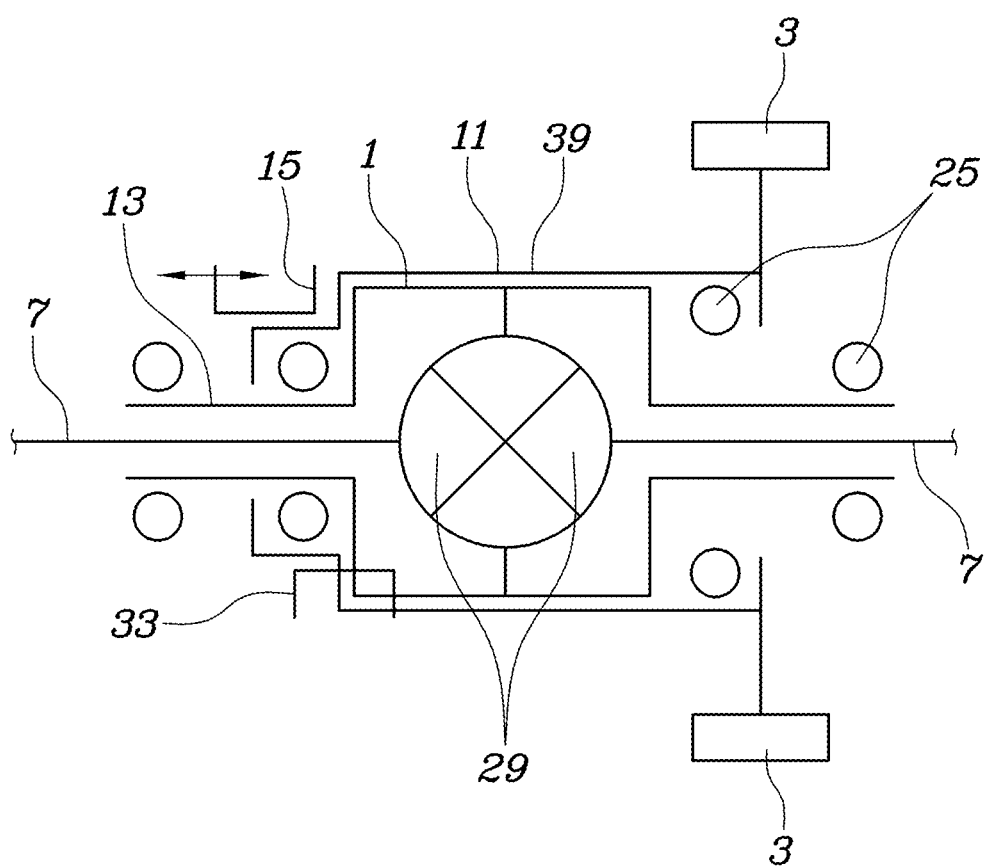
FIG. 6 is a diagram illustrating various exemplary embodiments of the power train for a vehicle according to various exemplary embodiments of the present invention.
Figure 7:
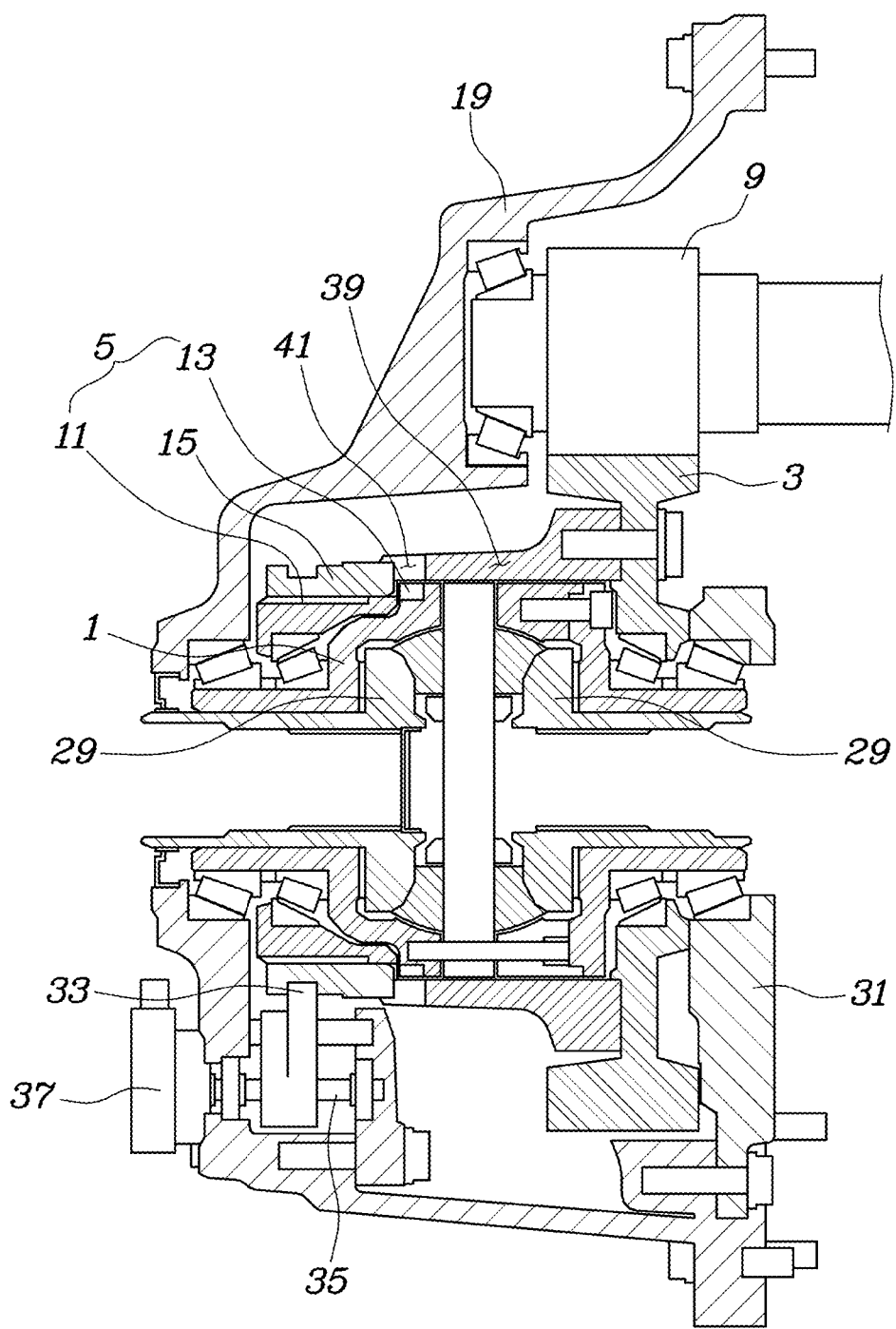
FIG. 7 is a diagram illustrating the various exemplary embodiments more actually.

FIG. 6 and FIG. 7 actually illustrate the various exemplary embodiments of the present invention, configured such that the differential ring gear 3 is connected to a cylinder 39 for surrounding the outside of the differential case 1; the first gear part 11 of the connection/disconnection mechanism 5 is formed on the cylinder 39; and the second gear part 13 of the connection/disconnection mechanism 5 is formed on the external circumferential surface of the differential case 1.

In the present configuration, the sleeve 15 is engaged to or disengaged from the second gear part 13 formed on the differential case 1 therein through a communication hole 41 formed in the cylinder 39.

In the present configuration, the cylinder 39 coupled integrally with the differential ring gear 3 surrounds the differential case 1 and the differential case 1 is supported by the bearings 25 on both end portions thereof to maintain the concentric support state between the differential ring gear 3 and the differential case 1 more securely, further improving durability.

Figure 8:
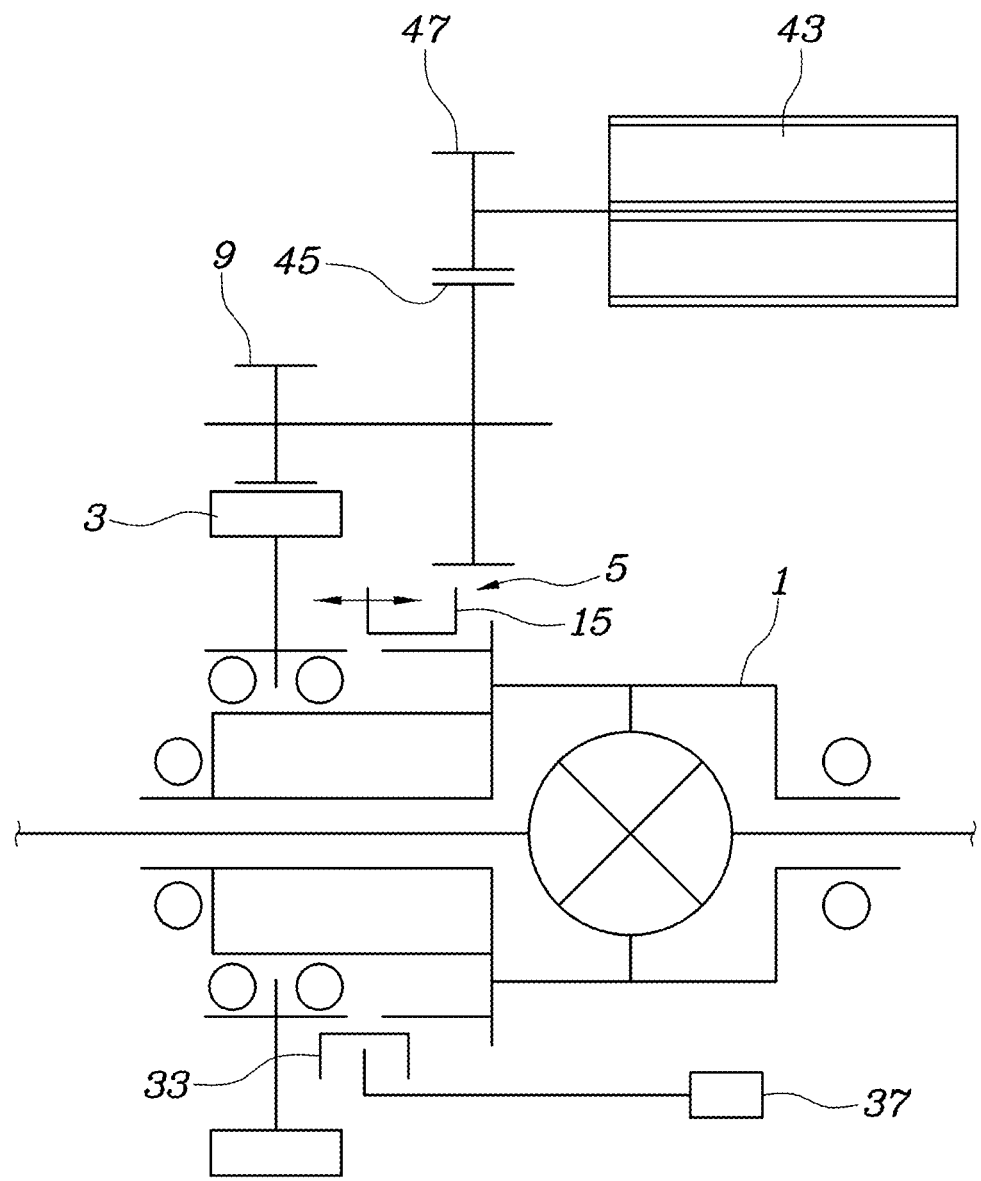
FIG. 8 is a diagram illustrating an example in which a motor is disposed to be parallel to and spaced from the configuration according to the various exemplary embodiments.
Figure 9:
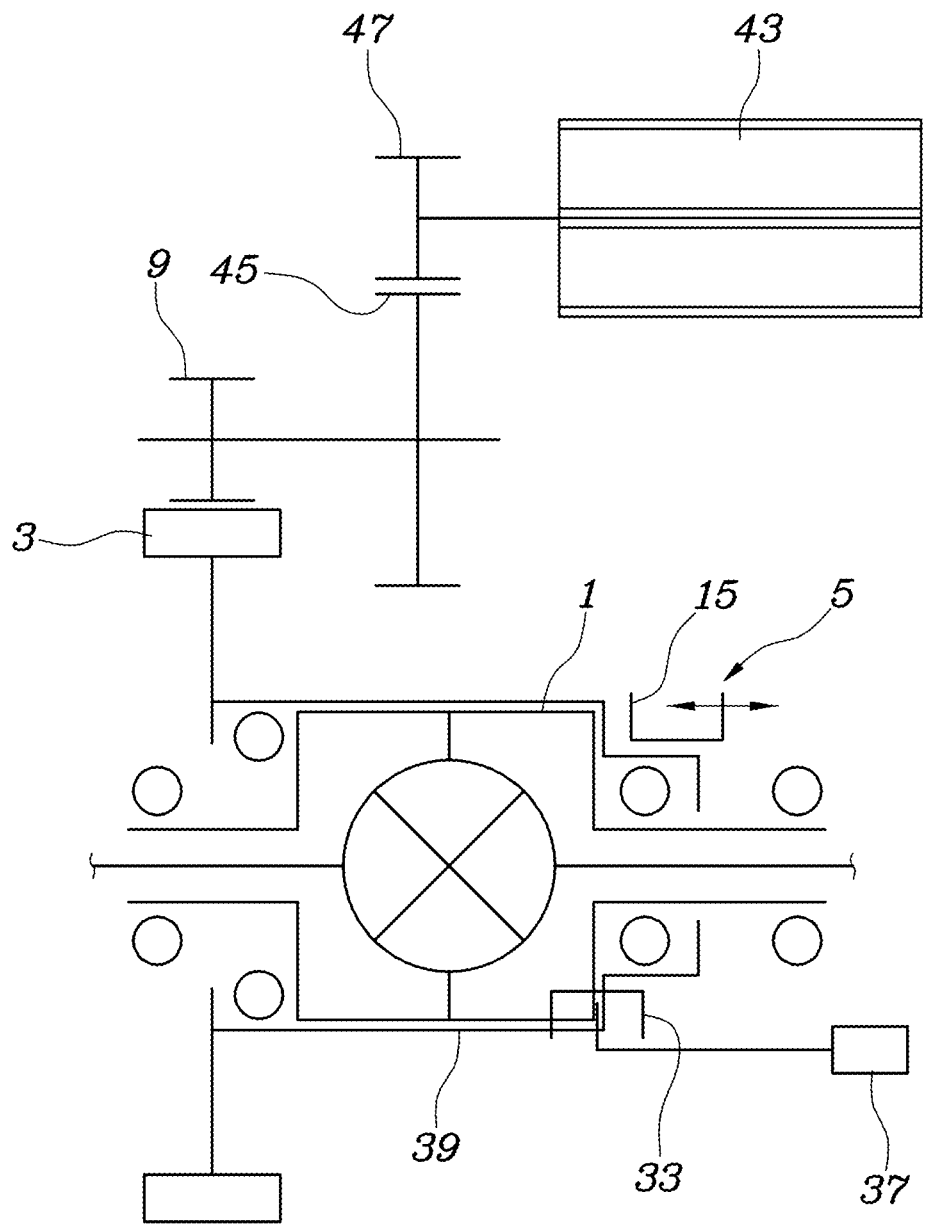
FIG. 9 is a diagram illustrating an example in which a motor is disposed to be parallel to and spaced from the configuration according to the various exemplary embodiments.

Meanwhile, as illustrated in FIG. 8 and FIG. 9, the aforementioned exemplary embodiments of the present invention may be configured so that the motor 43, which is the power source, is mounted to be parallel to and spaced from the rotation shaft of the differential ring gear 3.

That is, the differential ring gear 3 is engaged with the drive gear 9 for transferring the power from the motor 43; the drive gear 9 is fixedly connected to a speed reduction driven gear 45; the speed reduction driven gear 45 is engaged with a pinion 47 of the motor 43; and the motor 43 is configured so that the rotation shaft is mounted to be parallel to and spaced from the rotation shaft of the differential ring gear 3.

Figure 10:
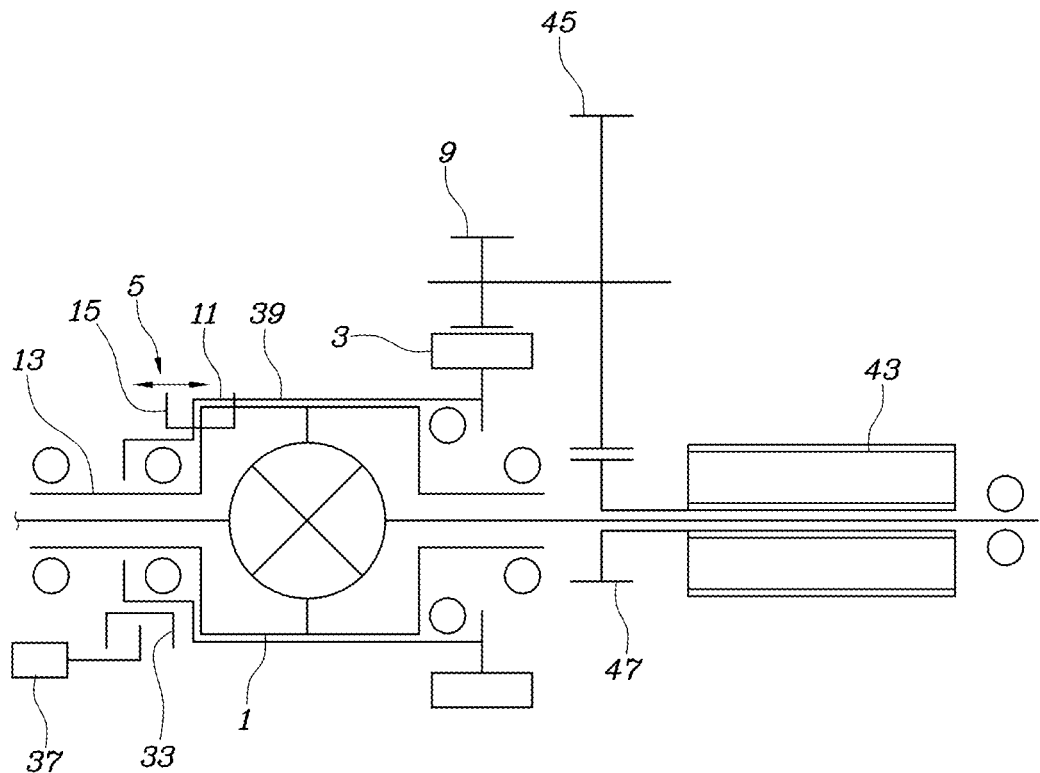
FIG. 10 is a diagram illustrating an example in which a motor is disposed concentrically with the configuration according to the various exemplary embodiments.
Figure 11:
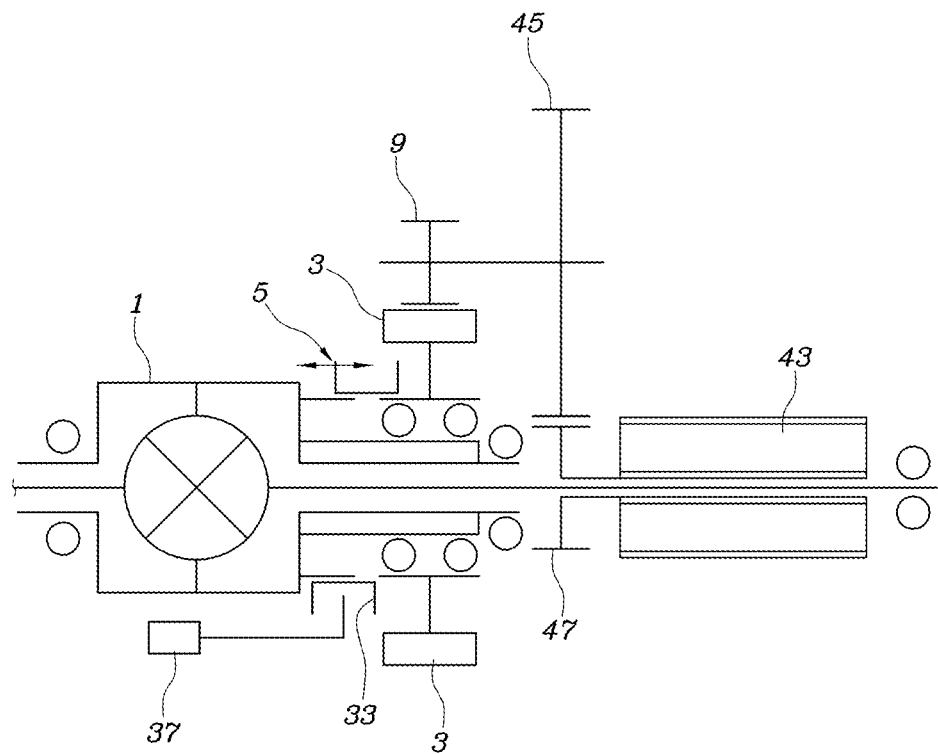
FIG. 11 is a diagram illustrating an example in which a motor is disposed concentrically with the configuration according to the various exemplary embodiments.

Furthermore, as illustrated in FIG. 10, and FIG. 11, the exemplary embodiments of the present invention may be configured so that the motor 43, which is the power source, is mounted to be concentric to the rotation shaft of the differential ring gear 3.

That is, the differential ring gear 3 is engaged with the drive gear 9 for transferring the power from the motor 43; the drive gear 9 is connected integrally with the speed reduction driven gear 45; the speed reduction driven gear 45 is engaged with the pinion 47 of the motor 43; and the rotation shaft of the motor 43 is mounted to be concentric to the rotation shaft of the differential ring gear 3.

At the present time, the rotation shaft of the motor 43 is formed of a hollow shaft, and the driveshaft 7 engaged with the side gear 29 of the differential is provided to penetrate the rotation shaft of the motor 43.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train for a vehicle, the power train comprising:
   a differential case;
   a differential ring gear aligned to be concentric to the differential case, and provided in a relatively rotatable state therebetween; and
   a connection/disconnection mechanism provided to connect or disconnect the differential ring gear and the differential case in a state where power is transferred thereto
   wherein the connection/disconnection mechanism includes:
      a first gear part provided on a side of the differential ring gear;
      a second gear part provided on a side of the differential case; and
      a sleeve linearly sliding in an axial direction of the differential ring gear to switch a state of being engaged with the first gear part and the second gear part and a state of being engaged with one of the differential ring gear and the differential case by linearly sliding in the axial direction of the differential ring gear,
   wherein the differential ring gear includes a hub and has an internal diameter portion on the hub supported by a housing,
   wherein the differential case has external diameter portions of first and second end portions thereof supported by the housing in a rotatable state,
   wherein the first gear part of the connection/disconnection mechanism is formed on an external circumferential surface of the hub of the differential ring gear,
   wherein the second gear part of the connection/disconnection mechanism is formed on an external circumferential surface of a ring part, which is formed to protrude from the differential case toward the hub of the differential ring gear,
   wherein a journal part protruding in the axial direction of the differential ring gear from the housing,
   wherein at least one outer bearing is provided on an outer side of the journal part,
   wherein at least one inner bearing is provided on an inner side of the journal part,
   wherein the hub of the differential ring gear is supported by the at least one outer bearing, and
   wherein the differential case is supported by the at least one inner bearing.

2. The power train of claim 1,
   wherein the differential ring gear includes the hub and has the internal diameter portion on the hub supported by an external circumferential surface of the differential case in a rotatable state, wherein the first gear part of the connection/disconnection mechanism is formed on the external circumferential surface of the hub of the differential ring gear, and wherein the second gear part of the connection/disconnection mechanism is formed on the external circumferential surface of the ring part, which is formed to protrude from the differential case toward the hub of the differential ring gear.

3. The power train of claim 1, wherein the differential ring gear includes the hub and has the internal diameter portion on the hub supported by an external circumferential surface of the differential case in a rotatable state, wherein the first gear part of the connection/disconnection mechanism is formed on the external circumferential surface of the hub of the differential ring gear, and wherein the second gear part of the connection/disconnection mechanism is formed on the external circumferential surface of the differential case.

4. The power train of claim 1, wherein the differential ring gear is connected to a cylinder surrounding an outside of the differential case, wherein the first gear part of the connection/disconnection mechanism is formed on the cylinder, and wherein the second gear part of the connection/disconnection mechanism is formed on an external circumferential surface of the differential case.

5. The power train of claim 1, wherein the differential ring gear is engaged with a drive gear for transferring the power from a motor, wherein the drive gear is fixedly connected to a speed reduction driven gear, wherein the speed reduction driven gear is engaged with a pinion of the motor, and wherein a rotation shaft of the motor is mounted to be parallel to the axial direction of the differential ring gear, and wherein the rotation shaft of the motor is spaced from the differential ring gear.

6. The power train of claim 1, wherein the differential ring gear is engaged with a drive gear for transferring the power from a motor, wherein the drive gear is fixedly connected to a speed reduction driven gear, wherein the speed reduction driven gear is engaged with a pinion of the motor, and wherein a rotation shaft of the motor is mounted to be concentric to the axial direction of the differential ring gear.

7. The power train of claim 6, wherein the rotation shaft of the motor is formed of a hollow shaft, and wherein a driveshaft engaged with a side gear of a differential is provided to penetrate the rotation shaft of the motor.

8. The power train of claim 1, wherein the sleeve is coupled to a shift fork for constraining each other in the axial direction and allowing a relative rotation, and wherein the shift fork is linearly slidable by a ball screw.

9. The power train of claim 8, wherein the ball screw is coupled to an actuator and rotatable by the actuator and when the actuator is driven, the shift fork drives the sleeve.

* * * * *